United States Patent [19]

Gregory et al.

[11] Patent Number: 6,008,331
[45] Date of Patent: Dec. 28, 1999

[54] DISAZO COMPOUNDS CONTAINING A PIPERAZINYLETHYSULFONYL GROUP

[75] Inventors: Peter Gregory, Bolton; Ronald Wynford Kenyon, Bridport; Paul Wight, Manchester, all of United Kingdom

[73] Assignee: Zeneca Limited, London, United Kingdom

[21] Appl. No.: 09/142,635

[22] PCT Filed: Feb. 21, 1997

[86] PCT No.: PCT/GB97/00482

§ 371 Date: Apr. 21, 1999

§ 102(e) Date: Apr. 21, 1999

[87] PCT Pub. No.: WO97/32931

PCT Pub. Date: Sep. 12, 1997

[30] Foreign Application Priority Data

Mar. 8, 1996 [GB] United Kingdom .................. 9604906
Mar. 8, 1996 [GB] United Kingdom .................. 9604907

[51] Int. Cl.⁶ .......................... C09B 31/08; C09B 67/22; C09B 62/513; C09D 11/00
[52] U.S. Cl. .............................. 534/642; 534/797; 8/639; 106/31.47
[58] Field of Search ..................................... 534/642, 797; 8/639; 106/31.47

[56] References Cited

U.S. PATENT DOCUMENTS

| 3,951,591 | 4/1976 | Birke et al. .......................... 534/641 X |
| 5,102,459 | 4/1992 | Ritter et al. .......................... 534/642 X |

FOREIGN PATENT DOCUMENTS

| 693537 | 1/1996 | European Pat. Off. . |
| 95 17471 | 6/1995 | WIPO . |
| 95 17472 | 6/1995 | WIPO . |
| 97/32932 | 9/1997 | WIPO . |

OTHER PUBLICATIONS

Beech, W.F., Fibre–Reactive Dyes, Logos Press Limited, London, Great Britain, 1970, 220–221.

Venkataraman, K., The Chemistry of Synthetic Dyes, Academic Press, New York, 1972, vol. VI, 43–45.

*Primary Examiner*—Fiona T. Powers
*Attorney, Agent, or Firm*—Pillsbury Madison & Sutro LLP

[57] ABSTRACT

A compound of the formula (1)

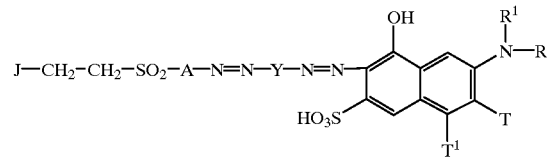

Formula (1)

or a salt thereof wherein J is a group of the formula (1a)

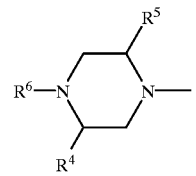

Formula (1a)

and $A$, $Y$, $T$, $T^1$, $R$, $R^1$, $R^4$, $R^5$ and $R^6$ are as defined in the specification are useful as black colorants for ink jet printing inks.

10 Claims, No Drawings

DISAZO COMPOUNDS CONTAINING A PIPERAZINYLETHYSULFONYL GROUP

This application is the national phase of international application PCT/GB97/00482 filed Feb. 21, 1997 which designated the U.S.

This invention relates to a coloured bisazo compound and aqueous solutions thereof suitable for use in the coloration of substrates, especially sheet materials such as paper, and especially by a printing process such as ink jet printing.

According to the present invention there is provided a compound of Formula (1) or a salt thereof:

Formula (1)

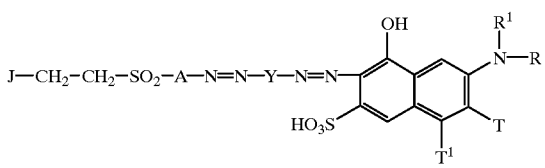

wherein:

J is a group of the Formula (1a):

Formula (1a)

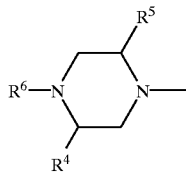

wherein:

Formula (1b)

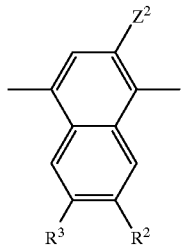

Formula (1c)

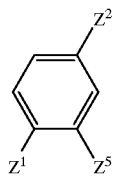

wherein $R^2$ & $R^3$ each independently is H, —COOH or —SO$_3$H;
$Z^1$ & $Z^5$ each independently is H, optionally substituted alkyl, optionally substituted alkoxy or —NZ$^3$Z$^4$;
$Z^2$ is H, halo, —COOH, —SO$_3$H, —OH, optionally substituted alkyl, optionally substituted alkoxy or optionally substituted alkylthio;
$Z^3$ is H or optionally substituted alkyl;

-continued $Z^4$ is H, optionally substituted alkyl or acyl;
$R^1$ is H, optionally substituted alkyl, alkylcarbonyl, alkylsulphonyl, alkoxycarbonyl, alkoxysulphonyl, arylcarbonyl or arylsulphonyl;
T & $T^1$ each independently is H or —SO$_3$H;
R is H, optionally substituted alkyl, optionally substituted aryl, or a group —B—NQ$^1$Q$^2$;
B is optionally substituted C$_{2-6}$-alkylene; and
$Q^1$ & $Q^2$ each independently is H, optionally substituted C$_{1-4}$-alkyl or $Q^1$ and $Q^2$ together with the N atom to which they are attached form an optionally substituted 5- or 6-membered ring.

When A is phenylene it is preferably phen-1,3-ylene or phen-1,4-ylene and when A is naphthylene it is preferably naphth-1,4-ylene or naphth-1,5-ylene.

When A is substituted it preferably carries from one to three, especially one or two substituents, preferably in the 2-, 3-, 4-, 2,4-, 3,4-, 2,5- or 3,5- positions when A is phenylene or in the 4-, 5-, 6-, 7-, 8-, 4,5-, 4,8-, 5,8-, or 6,7- positions when A is naphthylene Substituents on A are preferably selected from:

—COOH; —SO$_3$H; —OH; —CN; —NO$_2$; —PO(OH)$_2$; —B(OH)$_2$;

halo, preferably —Cl;

alkyl, preferably C$_{1-4}$-alkyl and especially methyl;

alkoxy, preferably C$_{1-4}$-alkoxy and especially methoxy;

—SO$_2$R$^7$, —COOR$^7$, —SO$_2$R$^7$ or —COR$^7$, wherein R$^7$ is optionally substituted C$_{1-4}$—alkyl or optionally substituted aryl, especially phenyl; and acylamino, especially alkyl- or aryl-carbonylamino or alkyl- or aryl-sulphonylamino, and more especially C$_{1-4}$-alkyl-CONH— or C$_{1-4}$-alkyl-SO$_2$NH—.

It is preferred that A is unsubstituted phen-1,4-ylene or naphth-1,4-ylene, or that it carries one or two substituents, more especially one, selected from —COOH, —SO$_3$H, methyl, methoxy and chloro. Examples of preferred and especially preferred optionally substituted phenylene and naphthylene groups represented by A are phen-1,4-ylene, phen-1,3-ylene, 2-methylphen-1,4-ylene, 2-methoxyphen-1,4-ylene, 3-methyl-phen-1,4-ylene, 2-sulphophen-1,4-ylene, naphth-1,4-ylene and naphth-1,5-ylene.

The group of Formula (1a) may be free from ionisable groups or it may carry an ionisable group. When the group of Formula (1a) is free from ionisable groups $R^6$ is preferably one of the groups mentioned above in relation to $R^6$ other than —COOH —SO$_3$H. When the group of Formula (1a) bears an ionisable group it is preferred that $R^6$ is an ionisable group e.g. $R^6$ can be COOH; —SO$_3$H; or alkyl, aryl, arylcarbonyl or arylsulphonyl, alkoxycarbonyl, alkoxysulphonyl, arylcarbonyl or arylsulphonyl, each of which is optionally substituted and each of which carries at least one ionisable group.

Preferably the group of Formula (1a) carries a carboxy group because this leads to dyes having a high optical density.

In the naphthylene group of Formula (1b) it is preferred that one of $R^2$ and $R^3$ is H and the other is H, —COOH or —SO$_3$H. Where one of $R^2$ and $R^3$ is —COOH or —SO$_3$H and the other is H, it is convenient to employ a mixture of isomeric compounds in one of which $R^2$ is —COOH or —SO$_3$H and $R^3$ is H and in the other $R^2$ is H and $R^3$ is —COOH or —SO$_3$H. It is preferred that $Z^2$ is H, methyl, methoxy, —SO$_3$H, —OH and more preferably H.

In the phenylene group of Formula (1c) wherein $Z^1$ is —NZ$^3$Z$^4$ it is preferred that $Z^3$ is H or C$_{1-4}$-alkyl, such as methyl or ethyl. It is especially preferred that $Z^3$ is H. Where $Z^4$ is alkyl this is preferably C$_{1-4}$-alkyl. Where $Z^4$ is acyl this is preferably $NH_2CO-$, $R^7CO-$ or $R^7SO_2-$, wherein $R^7$ is as hereinbefore defined. Where $Z^4$ is other than H, and especially where it is acyl, $Z^3$ is preferably H. It is especially preferred that $-NZ^3Z^4$ is $-NH_2$.

In the phenylene group of Formula (1c) wherein $Z^1$ is optionally substituted alkyl or optionally substituted alkoxy, it is preferred that $Z^1$ is $C_{1-4}$-alkyl, e.g. methyl or ethyl, or $C_{1-4}$-alkoxy, e.g. methoxy or ethoxy. It is especially preferred that $Z^1$ is H, methyl or methoxy.

In the phenylene group of Formula (1c) it is preferred that $Z^2$ is $C_{1-4}$-alkyl, $C_{1-4}$-alkoxy, $C_{1-4}$-alkylthio, $-Cl$, $-H$, $-COOH$ or $SO_3H$, more preferably $C_{1-4}$-alkyl, e.g. methyl or ethyl, or $C_{1-4}$-alkoxy, e.g. methoxy or ethoxy. It is especially preferred that $Z^2$ is H, methyl or methoxy.

The $C_{2-6}$-alkylene group represented by B is preferably a $C_2$- or $C_3$-alkylene group optionally substituted by a group listed below as an optional substituent for R. It is especially preferred that B is $-CH_2CH_2-$, $-CH_2CH(CH_3)-$, $-CH_2CH_2CH_2-$. It is preferred that T and $T^3$ are H.

Where R is alkyl this is preferably $C_{1-4}$-alkyl and where R is aryl this is preferably phenyl. Where the group represented by R is optionally substituted the optional substituents may be selected from $C_{1-4}$-alkyl or $-COOH$. Examples of atoms and groups represented by R are H, methyl, carboxymethyl, ethyl, carboxyethyl, phenyl, 3-carboxyphenyl, 4-carboxyphenyl, 2,4-dicarboxyphenyl and 3,5-dicarboxyphenyl.

It is preferred that $R^1$ and $R^6$ are each independently H, $C_{1-4}$-alkyl, $C_{1-4}$-alkyl-carbonyl or sulphonyl, $C_{1-4}$-alkoxy-carbonyl or sulphonyl or aryl-carbonyl or sulphonyl, especially phenylcarbonyl, each of which optionally carries an ionisable group. Examples of such groups are methyl, ethyl, acetyl, methylsulphonyl, methoxycarbonyl, ethoxycarbonyl, methoxysulphonyl and benzoyl. It is especially preferred that $R^1$ is H or $C_{1-4}$-alkyl and $R^6$ is H, $C_{1-4}$-alkyl, $C_{1-4}$-alkylcarbonyl, $C_{1-4}$-alkoxycarbonyl or benzoyl and more especially preferred that $R^1$ is H and $R^6$ is H, methyl, ethyl or acetyl. It is preferred that $R^4$ and $R^5$ are each independently H or $C_{1-4}$-alkyl and more especially preferred that $R^4$ and $R^5$ are both H.

The ionisable group is preferably a group containing an ionisable H atom, such as $-COOH$, $-SO_3H$ and $-PO_2(OH)_2$, or a salt thereof.

When R, $R^1$, $R^4$, $R^5$, $R^7$, $Q^1$, $Q^2$, $Z^1$, $Z^2$, $Z^3$, $Z^4$ or $Z^5$ is or includes alkyl, this is preferably $C_{1-4}$-alkyl, such as methyl, ethyl, propyl or butyl, optionally substituted by $C_{1-4}$-alkoxy, halo, especially chloro, $-OH$, $-COOR^8$ or $-SO_2OR^8$ in which $R^8$ is H, $C_{1-4}$-alkyl or phenyl. When $R^7$ is or includes optionally substituted aryl this is preferably phenyl, optionally substituted, preferably in the 2-, 3-, 4-, 2,4-, 3,4- or 3,5- positions, by a group or groups selected from $C_{1-4}$-alkyl, $C_{1-4}$-alkoxy, halo, $-OH$, $-NH_2$, $-CN$, $-NO_2$, $-COOR^8$ and $-SO_2OR^8$.

When $R^6$ is or includes optionally substituted alkyl, this is preferably $C_{1-4}$-alkyl, such as methyl, ethyl, propyl or butyl, optionally substituted by $C_{1-4}$-alkoxy, halo, especially chloro, $-OH$, $-COOR^9$ or $-SO_2OR^9$ in which $R^9$ is $C_{1-4}$-alkyl or phenyl. When $R^6$ is or includes optionally substituted aryl this is preferably phenyl, optionally substituted, preferably in the 2-, 3-, 4-, 2,4-, 3,4- or 3,5- positions, by a group or groups selected from $C_{1-4}$-alkyl, $C_{1-4}$-alkoxy, halo, OH, $NH_2$, CN, $NO_2$, $-COOR^9$ and $-SO_2OR^9$.

When $Q^1$ and $Q^2$, taken together with the N atom to which they are attached, form an optionally substituted 5- or 6-membered ring this is preferably piperazinyl, morpholinyl or piperidinyl optionally substituted on a ring carbon atom by one or more groups represented by $R^4$ and/or $R^5$ or, in the case of piperazinyl, on the ring N atom by a group represented by $R^6$.

In a preferred compound of Formula (1),

| | |
|---|---|
| J | is of Formula (1a) in which $R^4$ and $R^5$ are H and $R^6$ is H, $C_{1-4}$-alkyl, $-CO-C_{1-4}$-alkyl; |
| A | is phen-1,4-ylene or phen-1,3-ylene; |
| Y | is of Formula (1b) in which $R^3$ is H and $R^2$ is H or $-SO_3H$ and $Z^2$ is H; or |
| Y | is of Formula (1c) in which $Z^1$ is $C_{1-4}$-alkyl, $C_{1-4}$-alkoxy, di(COOH) or $-NH_2$; $Z^2$ is H, $C_{1-4}$-alkyl or $C_{1-4}$-alkoxy and $Z^5$ is H; |
| R | is H, $C_{1-4}$-alkyl, phenyl, phenylCOOH, phenyldi(COOH) or -B-$NQ^1Q^2$ in which B is -$CH_2CH_2-$, $-CH_2CH_2CH_2-$ or $-CH_2CH(CH_3)-$ and $Q^1$ and $Q^2$ are each independently H, $C_{1-4}$-alkyl, or $NQ^1Q^2$ is piperazinyl or 4-$C_{1-4}$-alkyl-piperazinyl; and $R^1$, T and $T^1$ are H. |

In a second preferred compound of Formula (1),

| | |
|---|---|
| J | is of Formula (1a) in which $R^4$ and $R^5$ are H and $R^6$ is $-COOH$, $-SO_3H$, carboxy-$C_{1-4}$-alkyl or sulpho-$C_{1-4}$-alkyl; |
| A | is phen-1,4-ylene or phen-1,3-ylene; |
| Y | is of Formula (1b) in which $R^3$ is H and $R^2$ is H or $-SO_3H$ and $Z^2$ is $-H$; or |
| Y | is of Formula (1c) in which $Z^1$ is $C_{1-4}$-alkyl, $C_{1-4}$-alkoxy or $-NH_2$ and $Z^2$ is H, $C_{1-4}$-alkyl or $C_{1-4}$-alkoxy and $Z^5$ is H; |
| R | is H, $C_{1-4}$-alkyl, phenyl, carboxyphenyl, dicarboxyphenyl or $-B-NQ^1Q^2$ in which B is $-CH_2CH_2-$, $-CH_2CH(CH_3)-$, or $-CH_2CH_2CH_2-$ and $Q^1$ and $Q^2$ are each independently H, $C_{1-4}$-alkyl, or $NQ^1Q^2$ is piperazinyl or 4-$C_{1-4}$-alkyl-piperazinyl; and $R^1$, T & $T^1$ are H. |

Although the compound of Formula (1) may be in the free acid form, that is a form in which each ionisable group, such as $-COOH$ or $-SO_3H$ is in the free acid form as hereinbefore shown, it is preferably in the form of a salt with one or more cations selected from an alkali metal, ammonium and optionally substituted ammonium cation. Preferably the cation is ammonium or optionally substituted $C_{1-4}$-alkylammonium. A preferred cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl)-ammonium and mono-, di-, tri- and tetra-(hydroxy-$C_{1-4}$-alkyl)ammonium. It is especially preferred that the compound of Formula (1), (2) or (3) is a salt with an ammonium (i.e. $NH_4^+$), or a mono- or poly-, methyl-, ethyl- or hydroxyethyl-ammonium cation or with a mixture of two or more cations, especially a mixture of alkali metal, (such as sodium) and optionally substituted ammonium cations. Examples of optionally substituted $C_{1-4}$-alkylammonium cations include mono-, di-, tri- and tetra-methylammonium, mono-, di-, tri- and tetra-ethylammonium, and mono-, di-, tri- and tetra-(2-hydroxyethyl)-ammonium.

The present compounds can be prepared by diazotising an amine of formula VS—A—$NH_2$, in which VS— is a vinylsulphone group (or a precursor thereof), preferably below 5° C. using a nitrite and mineral acid, coupling with a substituted aminonaphthalene carrying groups $R^2$, $R^3$ and $Z^2$ or with a substituted aniline carrying groups $Z^1$, $Z^2$ and $Z^5$ to give a monoazo compound, diazotising the monoazo compound and coupling with a Gamma Acid or 2R Acid derivative of Formula (2):

Formula (2)

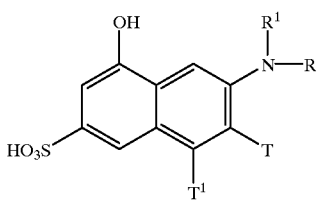

and converting the vinylsulphone group (or precursor thereof) on A into a group J—CH$_2$CH$_2$SO$_2$— by reaction with a piperazine of formula J—H.

The present compounds may also be prepared by converting the vinylsulphone group (or precursor thereof) on A into a group J—CH$_2$CH$_2$SO$_2$— by reaction with a piperazine of formula J—H after the first diazotisation followed by the second diazotisation and coupling with the compound of Formula (2).

Compounds of Formula (2) in which R is other than H may be prepared using the Bucherer reaction in which 1-hydroxy-3-sulpho-7-hydroxy-naphthalene or 1-hydroxy-3,6-disulpho-7-hydroxynaphthalene is reacted with an amine, R$^1$—NH—R, in the presence of an alkali metal or ammonium sulphite and bisulphite (e.g. Na$_2$SO$_3$ and NaHSO$_3$) with heating, preferably from 60–100° C. and especially 70–90° C. Where R$^1$ is acyl in the compound of Formula (1), the amine R$^1$—NH—R may be replaced by an amine, H$_2$N—R, and the acyl group incorporated subsequently by acylation of the secondary amino group, —NH—R. In the above processes J, A, R, R$^1$, R$^2$, R$^3$, Z$^1$, Z$^2$, Z$^5$, T and T$^1$ are as hereinbefore defined.

The present invention relates not only to a compound of Formula (1) but also to a composition comprising two or more such compounds. An example of such a composition is a mixture containing two compounds of Formula (1) in which Y is of Formula (1b) in one of which R$^3$ is H and R$^2$ is —COOH or —SO$_3$H and in the other R$^3$ is —COOH or —SO$_3$H and R$^2$ is H. It is preferred that such a composition contains two compounds of Formula (1) in a weight-to-weight ratio of 99:1 to 1:99, more preferably 90:10 to 10:90, especially 80:20 to 20:80, more especially 60:40 to 40:60.

The compound or composition of the present invention is conveniently synthesised in the form of an alkali metal, e.g. sodium salt. This may be converted wholly or partially into its ammonium or optionally substituted C$_{1-4}$-alkylammonium salt by dissolving in water the compound in the form of a salt with an alkali metal, acidifying the solution with a mineral acid, e.g. hydrochloric acid, separating of the precipitated compound in free acid form, suspending it in water, adjusting the suspension to pH 9–9.5 with ammonia or an optionally substituted C$_{1-4}$-alkylamine to form the water soluble ammonium or substituted ammonium salt, and removing alkali metal chloride ions by dialysis. Alternatively the alkali metal ion may be partially or wholly exchanged for an optionally substituted ammonium ion by a conventional ion exchange method.

It will be understood that the present invention covers all tautomeric forms of a compound of Formula (1), for example the tautomeric equivalent of Formula (1) in which the hydroxy group on the naphthalene ring is in the keto form.

A compound or composition of the present invention, especially in the form of its ammonium or optionally substituted C$_{1-4}$-alkylammonium salt, is useful as a black colorant for the preparation of inks. In the form of a salt with an alkali metal or ammonium ions it has good solubility in water and aqueous media and good water fastness and is capable of giving a strong black print with high-water-fastness on plain paper. The ammonium salt form of the dye is especially preferred because it gives prints of especially high water-fastness.

Compounds of Formula (1) in which Y is of Formula (1b) wherein R$^3$ is H and R$^2$ is H or —SO$_3$H and of Formula (1) in which Y is of Formula (1c) wherein Z$^1$ is NH$_2$ or C$_{1-4}$-alkoxy especially methoxy and Z$^2$ is alkoxy, especially methoxy, in the form of their ammonium or substituted ammonium salts, perform especially well as ink colorants.

The compound and composition are versatile, exhibiting high water fastness and rapid fixation on alkaline, neutral and acid papers, good solubility in aqueous ink media and good strong black prints with minimal bronzing.

According to a further feature of the present invention there is provided an ink comprising a compound or a composition according to the present invention and a liquid medium, preferably an aqueous medium. It is preferred that the compound or composition is completely dissolved in the liquid medium to form a solution.

The ink preferably contains from 0.5% to 20%, more preferably from 0.5% to 15%, and especially from 1% to 3%, by weight of the compound or composition, based on the total weight of the ink. Although many inks contain less than 5% by weight of colorant, it is desirable that the compound or composition has a water solubility of around 10% or more to allow the preparation of concentrates from which more dilute inks can be prepared and to minimise the chance of precipitation of colorant if evaporation of solvent occurs during use of the ink.

The liquid medium preferably comprises water or a mixture of water and one or more water-soluble organic solvents. The weight ratio of water to organic solvent(s) is preferably from 99:1 to 1:99, more preferably from 99:1 to 50:50 and especially from 95:5 to 80:20. The water-soluble organic solvent(s) is preferably selected from C$_{1-4}$-alkanols such as methanol, ethanol, n-propanol, isopropanol, n-butanol, sec-butanol, tert-butanol or isobutanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a C$_{2-6}$-alkylene group such as ethylene glycol, propylene glycol, butylene glycol, pentylene glycol or hexylene glycol and thiodiglycol; polyols such as glycerol or 1,2,6-hexanetriol; C$_{1-4}$-alkylethers of polyhydric alcohols such as 2-methoxy-ethanol, 2-(2-methoxyethoxy)ethanol, 2-(2-ethoxyethoxy)ethanol, 2-[2-(2-methoxy-ethoxy) ethoxy]ethanol, 2-[2-(2-ethoxyethoxy) ethoxy]ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-2-pyrrolidone; C$_{2-6}$-alkylene- and oligo-(C$_{2-6}$-alkylene)glycols, such as ethyleneglycol, diethyleneglycol, triethyleneglycol; and C$_{1-4}$-alkyl ethers of polyhydric alcohols and glycols such as 2-methoxy-2-ethoxy-2-ethoxyethanol; and poly-(C$_{2-4}$-alkyleneglycol)s with a molecular weight of up to 500. A preferred specific solvent mixture is a binary or ternary mixture of water and diethylene glycol and/or, 2-pyrrolidone or N-methyl-2-pyrrolidone in weight ratios 75-95:25-5 and 60-80:0-20:0-20 respectively.

Examples of suitable ink media are given in U.S. Pat. No. 4,963,189, U.S. Pat. No. 4,703,113, U.S. Pat. No. 4,626,284 and EP 4,251,50A.

A further aspect of the present invention provides a process for printing a substrate with an ink using an ink jet printer, characterised in that the ink contains at least one compound of Formula (1) as hereinbefore described.

A suitable process for the application of an ink as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

According to a still further aspect of the present invention there is provided a substrate printed with a compound of Formula (1).

A preferred substrate is an overhead projector slide or a cellulosic substrate, especially cotton or paper, especially plain and treated papers, which may have an acid, alkaline or neutral character.

The preferred ink used in the process is as hereinbefore described.

The invention is further illustrated by the following Examples in which all parts and percentages are by weight unless otherwise indicated.

EXAMPLE 1
Preparation of the Compound of Formula (A)

Stage 1

4-(4-[2-{4-methylpiperazinyl}ethylsulponyl] phenylazo)-2-methoxy-5-methylaniline To a stirred suspension of 4-(2'-(4"-methylpiperazinyl) ethylsulphonyl)-aniline (56.6 g) in ice/water (1 l) was added sufficient 2N NaOH solution to raise the pH to 8 and bring about a clear solution, followed by $NaNO_2$ (15.2 g). This mixture was then added to a solution of conc HCl (50 ml) in ice/water (150 g) at 0–10° C. When the addition was complete the resultant diazo suspension was stirred at 0–10° C. for 2 hour and residual $HNO_2$ destroyed by addition of sulphamic acid.

2-Methoxy-5-methylaniline (27.4 g) was dissolved in ethanol (500 ml) and added to the above diazo suspension at 0–10° C. Water was added to raise the total volume to 2.5 l and the mixture was stirred for 18 hours allowing the temperature to rise to 20° C. The precipitated product was filtered off and the filter cake washed with water and dried at 70° C.

Stage 2

N-(2-Piperazinylethyl)-Gamma acid

A mixture of 1-(2-aminoethyl)piperazine (387 g), 1,7-dihydroxy-3-sulpho-naphthalene (285 g), $NaHSO_3$ (280 g) and water (1.25l) was stirred and heated at 85–90° C. for 18 hours. The solution was filtered from a little insoluble material and the filtrate cooled to 10–20° C. Concentrated HCl was slowly added to adjust the pH to 2 and the reaction mixture then salted to 10% with NaCl. The mixture was stirred for 6 hours and the product filtered off, washed with 20% NaCl solution and dried at 60° C. (yield 215 g).

Stage 3

The product of Stage 1 (23 g) was dissolved in water (800 ml) at room temperature by the addition of sufficient 2N NaOH to raise the pH to 9–10 and $NaNO_2$ (5.5 g) was added. This solution was added over a period of 10 minutes to a mixture of concentrated HCl (30 ml) and ice-water (150 ml), maintaining the temperature at 0–10° C. After 3 hours at 0–10° C. excess $HNO_2$ was destroyed by the addition of sulphamic acid to give a diazo solution.

N-(2-piperazinylethyl)-Gamma Acid (30.2 g) from Stage 2 was dissolved in water (500 ml) by the addition of 2N NaOH to pH 9.0 followed by $Na_2CO_3$ and the solution was cooled to 0–10° C. The diazo solution was then added slowly over 10 minutes, maintaining the temperature at 0–10° C. by the addition of ice and the pH at 9–10 by addition of 2N NaOH solution. The mixture was then stirred for 18 hours allowing the temperature to rise to 20° C. The suspension was then heated to 70° C., salted to 20% with NaCl and the pH adjusted to 6 with 2N HCl. The precipitated product (of Formula (A) in Na salt form) was filtered and washed with 25% NaCl solution.

Stage 4

The filter paste from Stage 3 was dissolved in water (1 l) by adjusting the pH to 9–10 with conc $NH_4OH$. It was then (A)

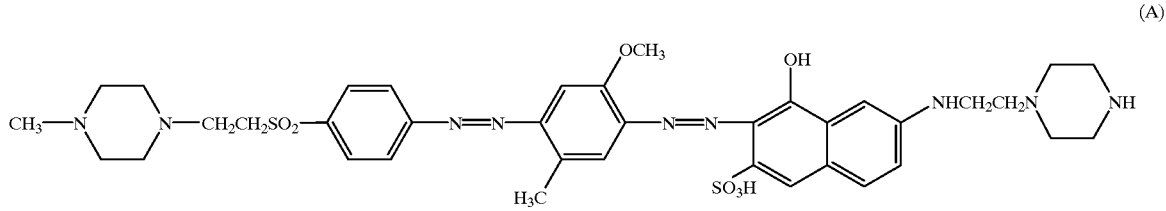

slowly added to 2N HCl (2 l). The compound of Formula (A), in free acid form, was filtered and washed with 1N HCl. This procedure was repeated twice before the filter paste was added to water (500 ml) and the solid completely dissolved by adjusting to pH 9–10 with conc $NH_4OH$. The solution was dialysed until Cl⁻ could no longer be detected, screened through a 0.45μm filter, and the product of Formula (A) (as ammonium salt) isolated by evaporation and dried at 70° C.

The compound of Formula (A) (ammonium salt) (2.5 parts) was added to a mixture of water (90 parts) and diethylene glycol (10 parts) and printed onto plain paper substrate using a thermal ink jet printer. The print had a bluish-black shade with excellent water fastness and a fast rate of fixation to the substrate.

EXAMPLE 2

Example 1 was repeated except that in place of 4-(2'-(4"-methylpiperazinyl) ethylsulphonyl)-aniline there was used 4-(2'-(4"-carboxymethyl piperazinyl)ethylsulphonyl) aniline.

The resultant black dye was made into ink using the formulation described in Example 1 and was found to print plain paper a bluish-black shade with excellent water-fastness and rate of fixation.

EXAMPLE 3

Preparation of

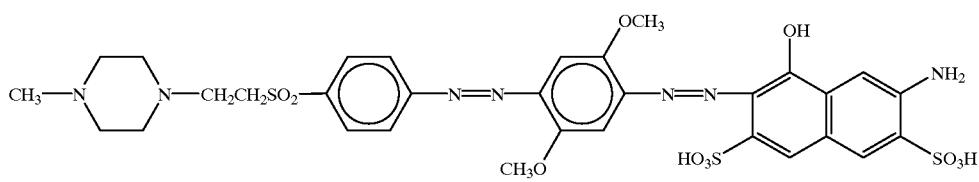

Stage 1

Sodium nitrite (38 g, 0.55 mol) was added to a stirred suspension of 4-(β-sulphatoethylsulphonyl aniline ("Component A", 140.5 g, 0.5 mol) in water (1.5 L), at pH 6.5–7.0. This mixture was cooled to below 5° C. and concentrated HCl (125 ml) was added dropwise, maintaining temperature at 0–5° C. The resulting cloudy yellow mixture was left to stir, at 0–10° C., pH ~2, for a further 3 hrs. Excess nitrous acid was then destroyed by adding sulfamic acid to give a diazo suspension. 2,5-Dimethoxyaniline ("Component B", 76.5 g, 0.5 mol) was dissolved in methylated spirits (750 ml) and cooled to <5° C. To this stirred solution the above diazo suspension was added in a slow stream, at 0–10° C. A red mixture was obtained. This was further stirred at 0–10° C. for 2 hrs before allowing the mixture to warm to room temperature and leaving it to stir overnight. The next morning stirring was stopped and the mixture was left to settle for half an hour before filtering. The filter cake was washed with saturated brine solution (500 ml) and then left to dry in the vacuum oven (60° C.) until constant weight. The solid was then ground to give a monoazo compound in powdered form (187.5 g, 0.42 mol).

Stage 2

A solution of N-methylpiperazine ("Component C", 41 g, 0.41 mol) in water (500 ml) was heated to 65 ° C. To this stirred solution, the product from stage 1 (90 g, 0.2 mol), was added portionwise. The resultant mixture was stirred at this temperature and pH 9 for 2 hours before stopping the stirring and allowing to cool to room temperature overnight. Water was removed under vacuum to leave a tar. Concentrated ammonia was added to the tar to give a brittle solid. The solid was filtered-off, washed with a little water and dried in the oven, at 60° C. until constant weight (64.7 g, 0.15 mol).

Stage 3

The product from stage 2 (20 g, 0.045 mol) was dissolved in water (300 ml) and concentrated HCl (20 ml) and then cooled to 5° C. To this stirred solution, sodium nitrite (3.4 g, 0.049 mol) in water (50 ml), was added slowly, maintaining the temperature at 0–10° C. The mixture was stirred for a further 2 hours at this temperature. Excess nitrous acid was then destroyed by the careful addition of sulfamic acid to give azo solution 2. 1-Hydroxy-7-amino-3,6-disulphonaphthalene ("component D") (15.6 g, 0.046 mol) was dissolved in water (150 ml), pH 9.5 and cooled to 5° C. Azo solution 2 was then added slowly to this stirred solution, maintaining the above conditions.

A black mixture was obtained and this was further stirred at 5–10° C. for 2 hours before leaving to stir overnight allowing to warm to room temperature. The pH was lowered to ~3.5 (using concentrated HCl) and the resultant precipitate was filtered-off, dried then redissolved in water and ammonia (pH 10). The solid was re-precipitated by pouring the solution into a stirring 4M HCl solution (1:1). The precipitate was filtered-off and dried on a buchner funnel until damp. The process of making the ammonium salt was repeated. Finally the solid was redissolved in water/ammonia and dialysed in a dialysis tube to remove chloride ions. The resultant solution was filtered through GF/F paper and dried in an oven at 60° C. The title product was obtained in a yield of 26.3 g (0.03 mol).

EXAMPLES 4 to 52

The general method of Example 3 was repeated except that in place of component A, B, C or D there was used the component listed in Table A below. Where no component is specified in Table A, the component used was exactly the same as in Example 3.

TABLE A

| Example | Component A | Component B | Component C | Component D |
|---|---|---|---|---|
| 4 | | 1-amino naphthalene | | 1-hydroxy-7-(4-carboxyphenyl amino)-3-sulpho naphthalene |
| 5 | | 1-amino-7-sulpho naphthalene | 2-methyl piperazine | 1-hydroxy-7-(4-carboxyphenyl amino)-3-sulpho naphthalene |
| 6 | | 1-amino-7-sulpho naphthalene | N-formyl piperazine | 1-hydroxy-7-(4-carboxyphenyl amino)-3-sulpho naphthalene |
| 7 | | 1-amino naphthalene | N-(2-hydroxy ethyl) piperazine | 1-hydroxy-7-(4-carboxyphenyl amino)-3-sulpho naphthalene |
| 8 | | 1-amino naphthalene | N-formyl piperazine | 1-hydroxy-7-amino-3,6-disulphonaphthalene |
| 9 | | 1-amino naphthalene | N-(2-hydroxy ethyl) piperazine | 1-hydroxy-7-amino-3,6-disulphonaphthalene |
| 10 | | 1-amino naphthalene | 2-methyl piperazine | 1-hydroxy-7-amino-3,6-disulphonaphthalene |
| 11 | | | | 1-hydroxy-7-(4-carboxyphenyl amino)-3-sulpho naphthalene |
| 12 | | | N-acetyl | 1-hydroxy-7-(4- |

TABLE A-continued

| Example | Component A | Component B | Component C | Component D |
|---|---|---|---|---|
| 13 | | | N-(2-hydroxyethyl) piperazine | 1-hydroxy-7-(4-carboxyphenyl amino)-3-sulpho naphthalene |
| 14 | | 2-methoxy-5-methyl aniline | N-acetyl piperazine | 1-hydroxy-7-(4-carboxyphenyl amino)-3-sulpho naphthalene |
| 15 | | 2-methoxy-5-methyl aniline | | 1-hydroxy-7-(4-carboxyphenyl amino)-3-sulpho naphthalene |
| 16 | | | N-carboxy methylene piperazine | 1-hydroxy-7-(4-carboxyphenyl amino)-3-sulpho naphthalene |
| 17 | | 2-methoxy-5-amino aniline | | 1-hydroxy-7-(4-carboxyphenyl amino)-3-sulpho naphthalene |
| 18 | | 2-methoxy-5-amino aniline | | 1-hydroxy-7-amino-3-sulpho naphthalene |
| 19 | | 1-amino naphthalene | | 1-hydroxy-7-amino-3-sulpho naphthalene |
| 20 | | | N-(2-hydroxy ethyl) piperazine | 1-hydroxy-7-amino-3-sulpho naphthalene |
| 21 | | | | 1-hydroxy-7-amino-3-sulpho naphthalene |
| 22 | | 2-methoxy-5-amino aniline | N-(2-hydroxy ethyl) piperazine | 1-hydroxy-7-amino-3-sulpho naphthalene |
| 23 | | 1-amino-7-sulpho naphthalene | | 1-hydroxy-7-amino-3-sulpho naphthalene |
| 24 | | 2-methoxy-5-acetamido aniline | | 1-hydroxy-7-amino-3-sulpho naphthalene |
| 25 | | 2-methoxy-5-methyl aniline | | 1-hydroxy-7-(2-[1-piperazinyl] ethylamino)3-sulpho naphthalene |
| 26 | | 2-sulpho-5-amino aniline | | 1-hydroxy-7-amino-3-sulpho naphthalene |
| 27 | | 1-amino naphthalene | N-carboxy methylene piperazine | 1-hydroxy-7-(4-carboxy phenylamino)-3-sulpho naphthalene |
| 28 | | 1-amino-7-sulpho naphthalene | N-carboxy methylene piperazine | 1-hydroxy-7-(4-carboxy phenylamino)-3-sulpho naphthalene |
| 29 | | 1-amino naphthalene | N-carboxy methylene piperazine | amino-3-sulpho naphthalene |
| 30 | | | N-carboxy methylene piperazine | 1-hydroxy-7-(2-[1-piperazinyl] ethylamino)3-sulpho naphthalene |
| 31 | | | N-carboxy methylene piperazine | 1-hydroxy-7-N-(2-piperazinyl-ethyl)-3-sulpho naphthalene |
| 32 | | 2-acetamido-5-methoxy aniline | N-carboxy methylene piperazine | 1-hydroxy-7-(4-carboxyphenyl amino)-3-sulpho naphthalene |
| 33 | | | N-carboxy methylene piperazine | 1-hydroxy-7-dimethylamino-3-sulpho naphthalene |
| 34 | | 1-amino naphthalene | N-carboxy methylene piperazine | 1-hydroxy-7-dimethylamino-3-sulpho naphthalene |
| 35 | | 1-amino naphthalene | N-carboxy methylene piperazine | 1-hydroxy-7-(2-[1-piperazinyl] ethylamino)3-sulpho naphthalene |
| 36 | | 5-amino-2-methoxy aniline | N-carboxy methylene piperazine | 1-hydroxy-7-(N-carboxyphenyl amino)-3-sulpho naphthalene |
| 37 | | 2-methoxy-5-acetamido aniline | N-carboxy methylene piperazine | 1-hydroxy-7-amino-3-sulpho naphthalene |
| 38 | | 2-amino-5-methoxy aniline | N-carboxy methylene piperazine | 1-hydroxy-7-amino-3-sulpho naphthalene |
| 39 | | 2-methoxy-5-acetamido aniline | N-carboxy methylene piperazine | 1-hydroxy-7-(2-[1-piperazinyl] ethylamino)3-sulpho naphthalene |
| 40 | | 2-methoxy-5-amino aniline | N-carboxy methylene piperazine | 1-hydroxy-7-(2-[1-piperazinyl] ethylamino)3-sulpho naphthalene |
| 41 | 3-(β-sulphato ethyl sulphonyl) aniline | 2-methoxy-5-methyl aniline | N-acetyl piperazine | 1-hydroxy-7-(4-carboxyphenyl amino)-3-sulpho naphthalene |
| 42 | 3-(β-sulphato ethyl sulphonyl) aniline | | N-acetyl piperazine | 1-hydroxy-7-(4-carboxyphenyl amino)-3-sulpho naphthalene |
| 43 | 3-(β-sulphato ethyl sulphonyl) aniline | 2-methoxy-5-methyl aniline | N-(2-hydroxy ethyl) piperazine | 1-hydroxy-7-(4-carboxyphenyl amino)-3-sulpho naphthalene |
| 44 | 3-(β-sulphato ethyl sulphonyl) aniline | | N-(2-hydroxy ethyl) piperazine | 1-hydroxy-7-(4-carboxyphenyl amino)-3-sulpho naphthalene |
| 45 | 3-(β-sulphato ethyl | | | 1-hydroxy-7-(4-carboxyphenyl amino)-3- |

TABLE A-continued

| Example | Component A | Component B | Component C | Component D |
|---|---|---|---|---|
| | sulphonyl) aniline | | | sulpho naphthalene |
| 46 | 3-(β-sulphato ethyl sulphonyl) aniline | 2-methoxy-5-amino aniline | | 1-hydroxy-7-(4-carboxyphenyl amino)-3-sulpho naphthalene |
| 47 | 3-(β-sulphato ethyl sulphonyl) aniline | 2-methoxy-5-amino aniline | | 1-hydroxy-7-amino-3-sulpho naphthalene |
| 48 | 3-(β-sulphato ethyl sulphonyl)-6-methoxy aniline | | | 1-hydroxy-7-(4-carboxy phenylamino)-3-sulpho naphthalene |
| 49 | 3-(β-sulphato ethyl sulphonyl)-6-methoxy aniline | | N-(2-hydroxy ethyl) piperazine | 1-hydroxy-7-amino-3-sulpho naphthalene |
| 50 | 3-(β-sulphato ethyl sulphonyl)-6-methoxy aniline | | N-carboxy methylene piperazine | 1-hydroxy-7-(4-carboxy phenyl)-3-sulpho naphthalene |
| 51 | 3-(β-sulphato ethyl sulphonyl)-6-methoxy aniline | 1-amino naphthalene | N-carboxy methylene piperazine | 1-hydroxy-7-(4-carboxy phenyl)-3-sulpho naphthalene |
| 52 | 3-(β-sulphato ethyl sulphonyl)-6-methoxy aniline | 1-amino naphthalene | N-carboxy methylene piperazine | 1-hydroxy-7-amino-3-sulpho naphthalene |

By way of illustration the dyes resulting from Examples 4 to 52 had the structures shown on the following pages. These structures show the skeleton of the dyes and hydrogen atoms are not shown.

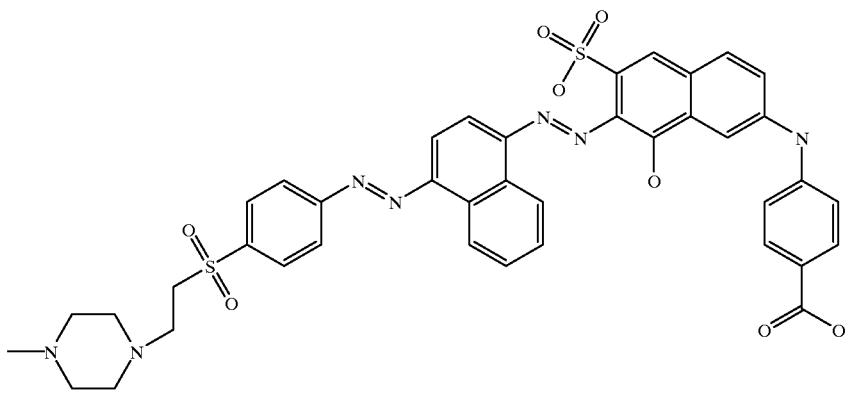

5
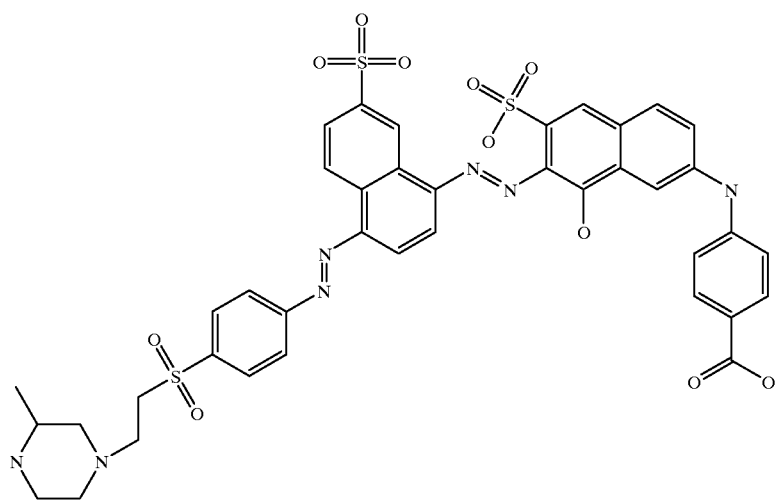
6
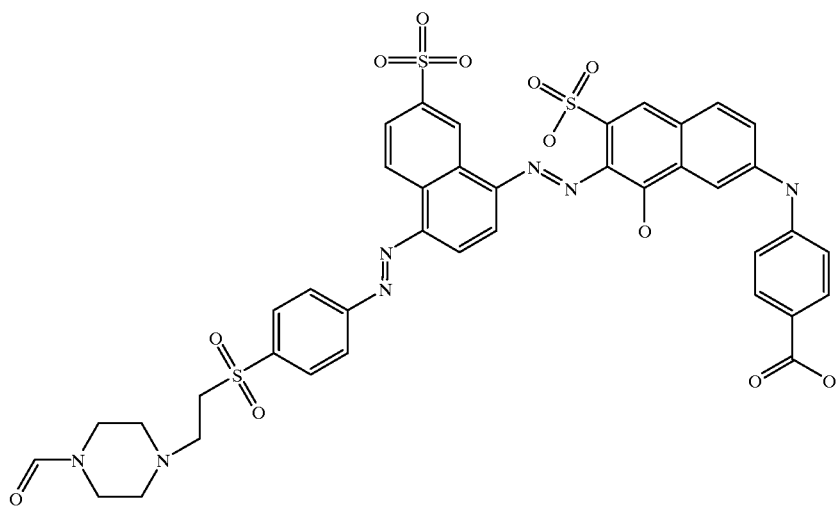
7
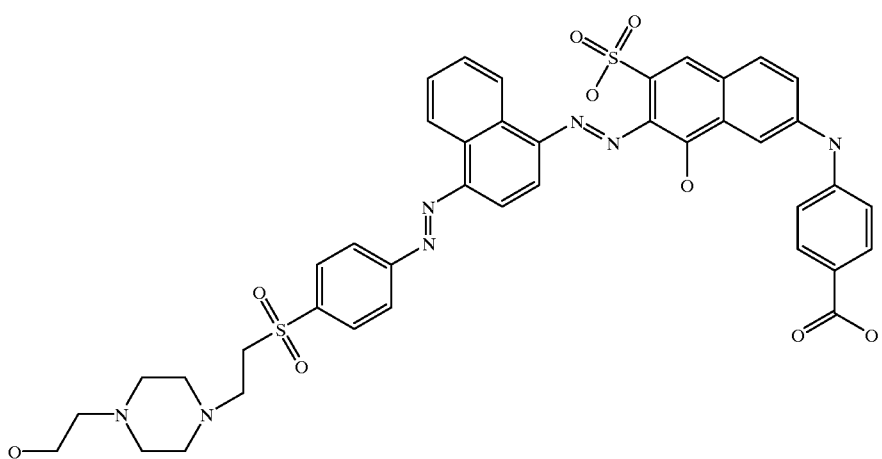

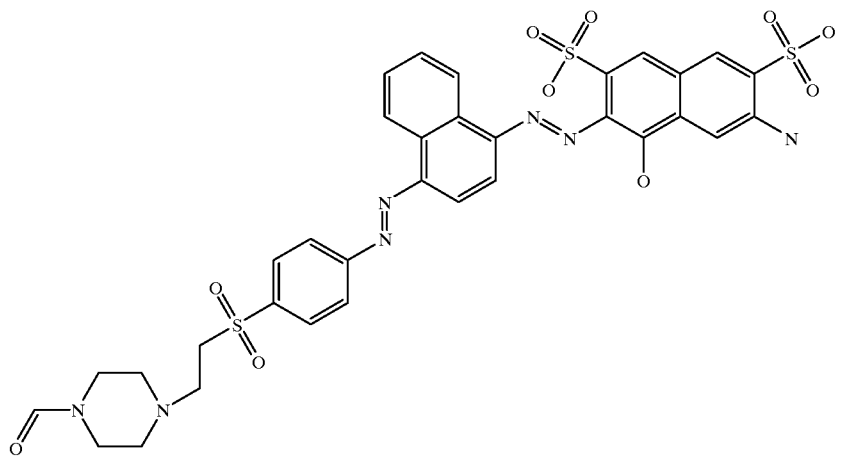
8
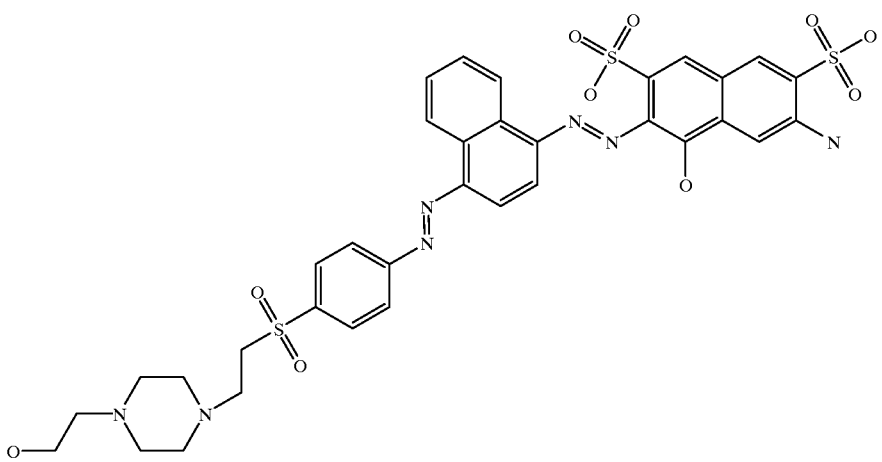
9
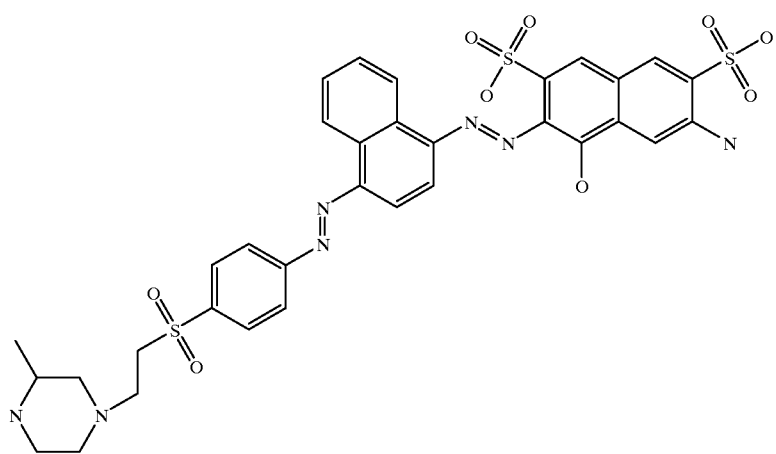
10

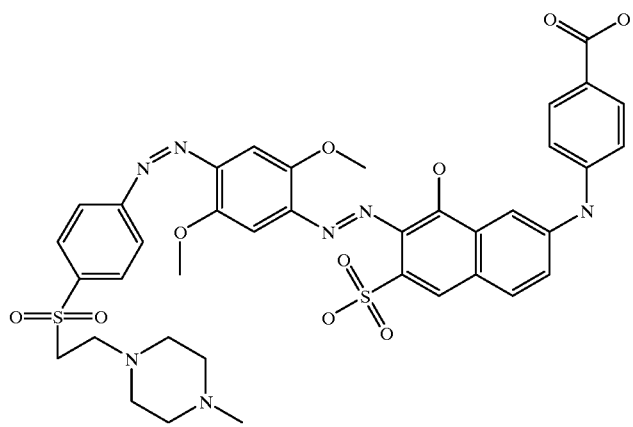
11
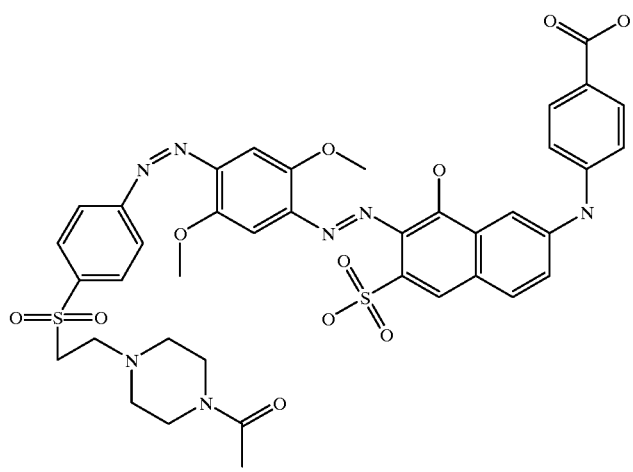
12
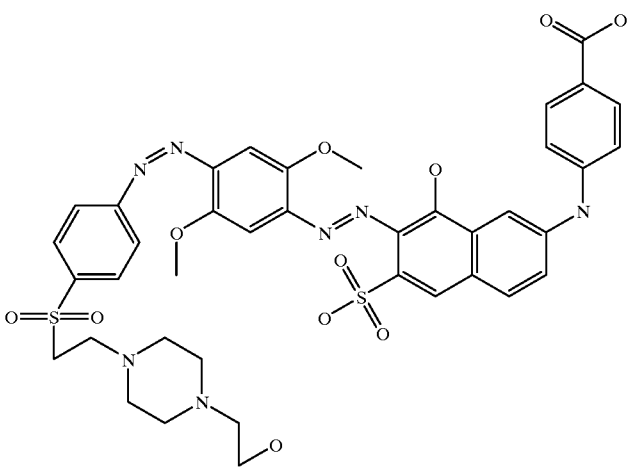
13

14
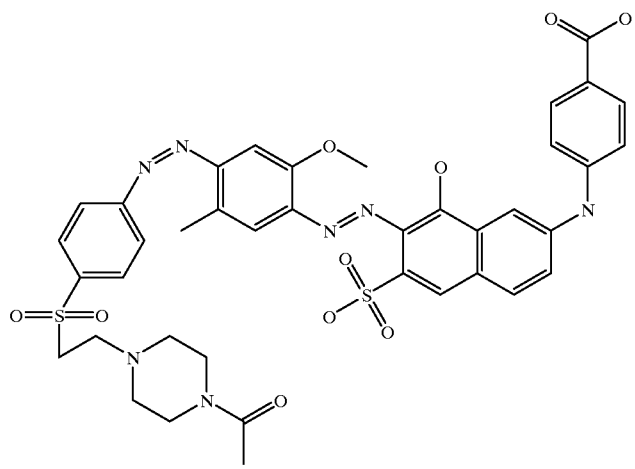
15
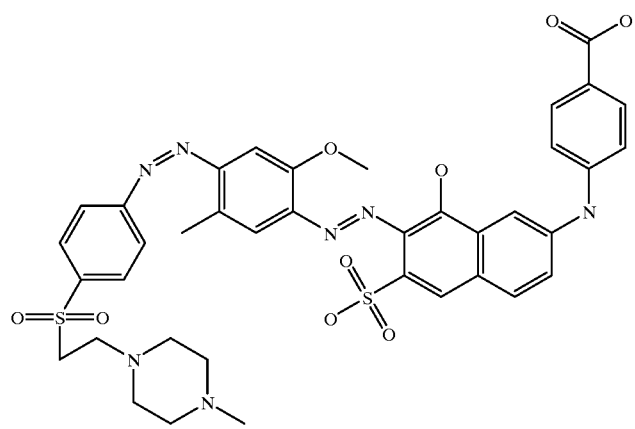
16
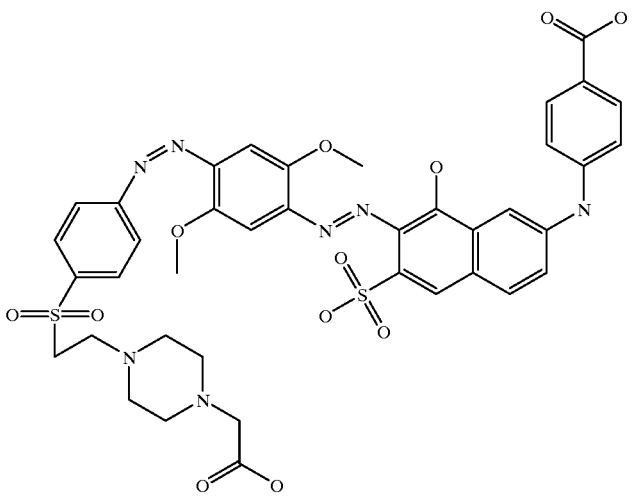

-continued
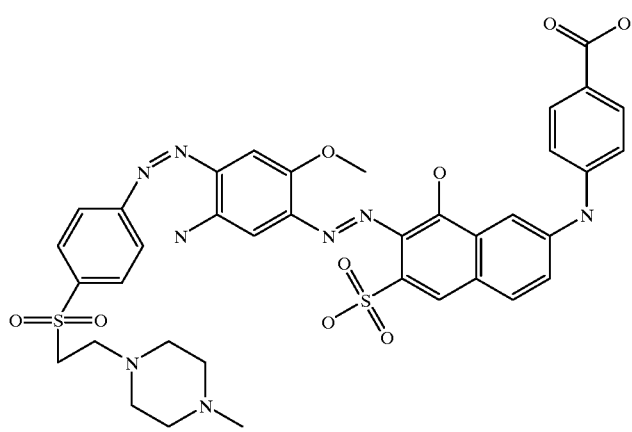
17
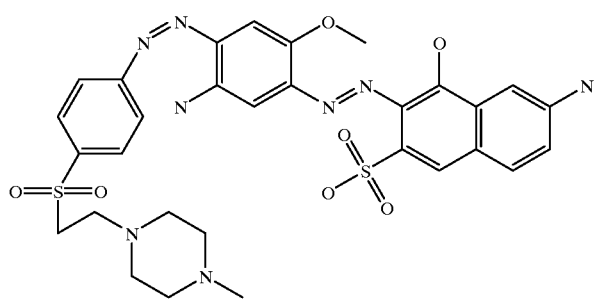
18
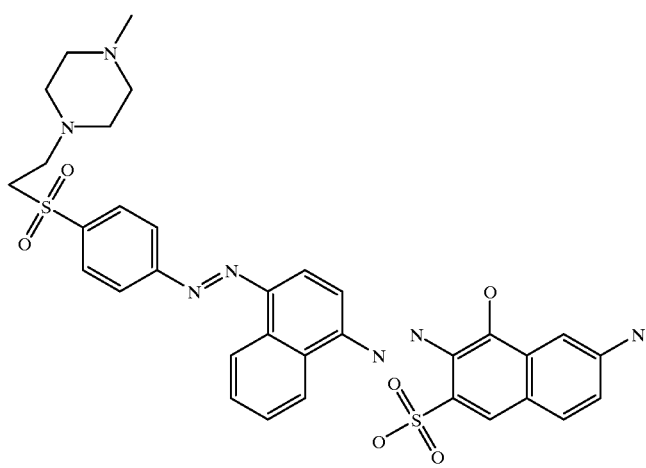
19
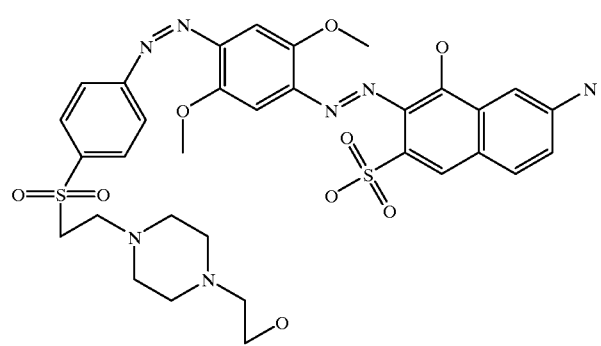
20

-continued
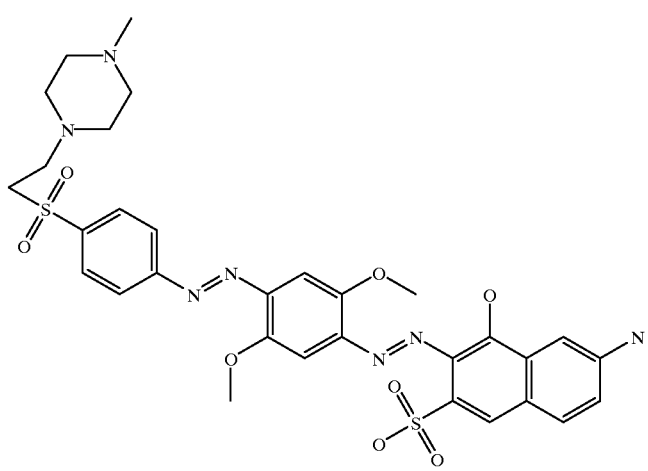
21
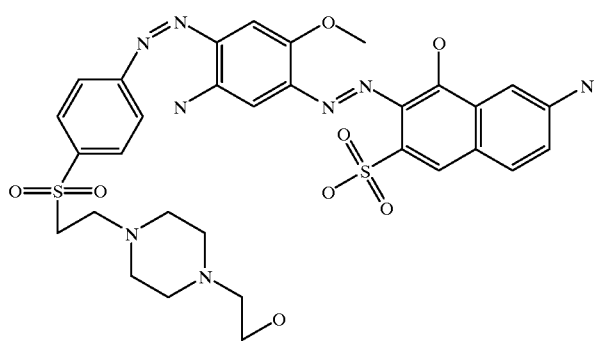
22
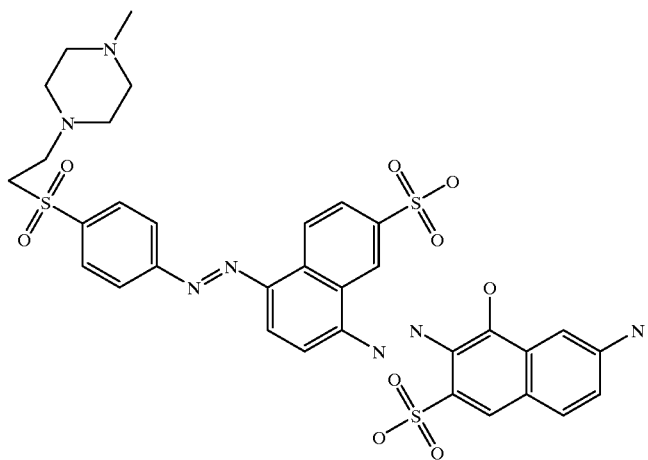
23

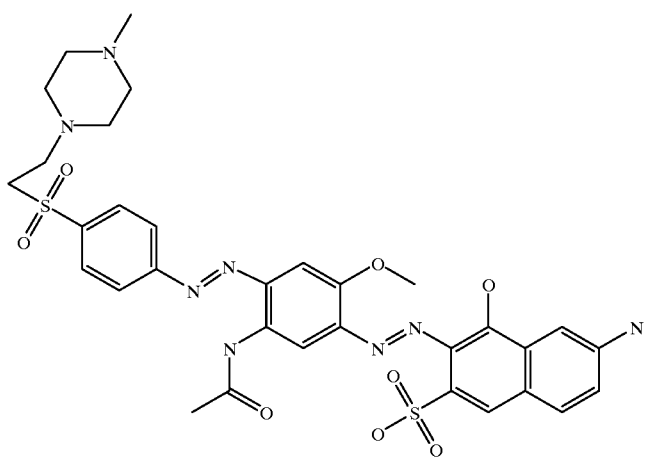
24
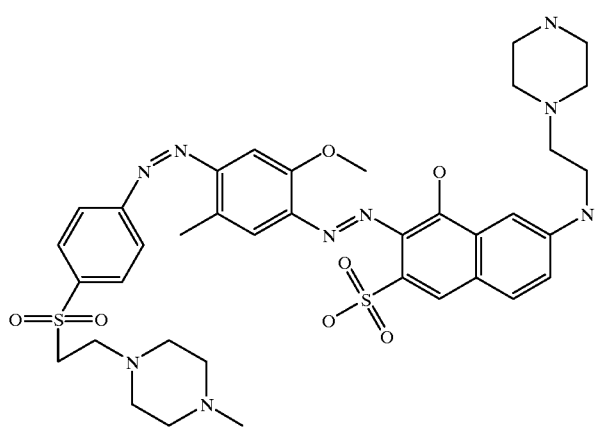
25
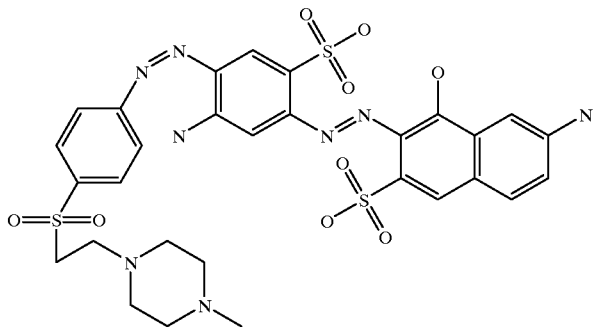
26

27
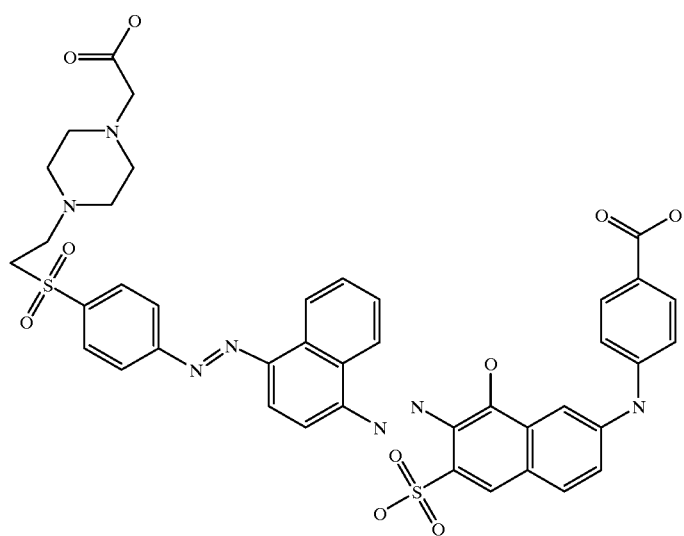
28
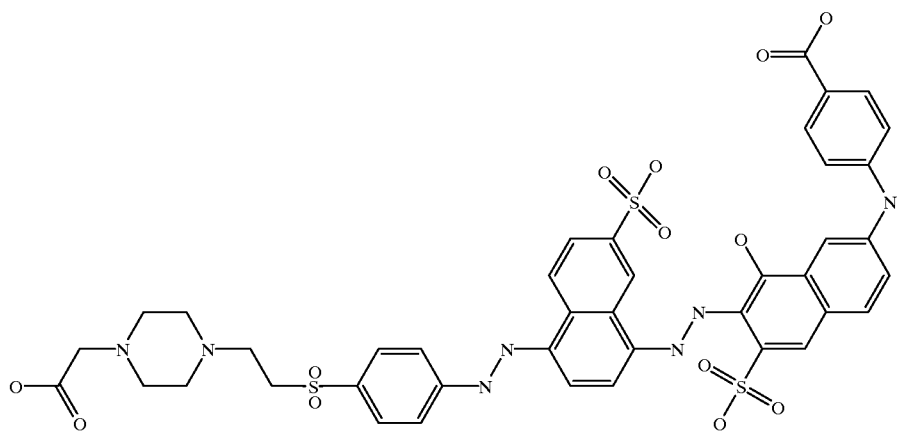
29
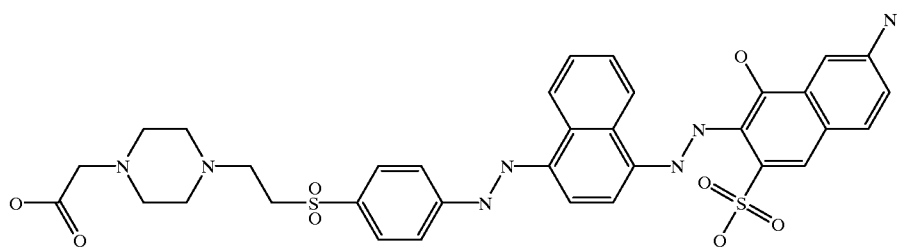
30
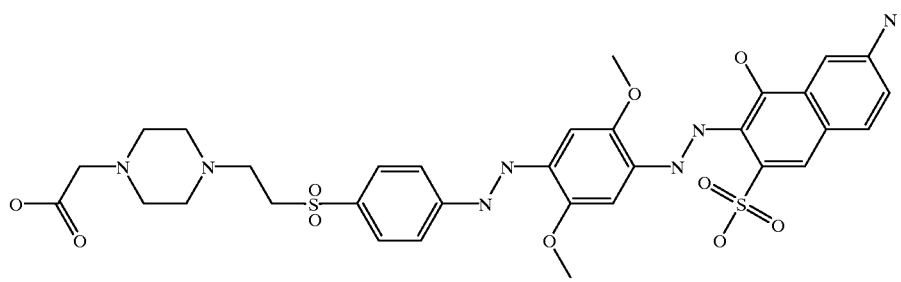

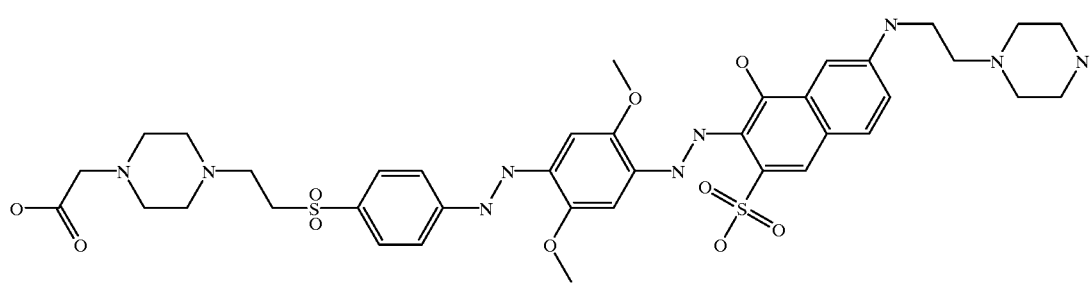
31
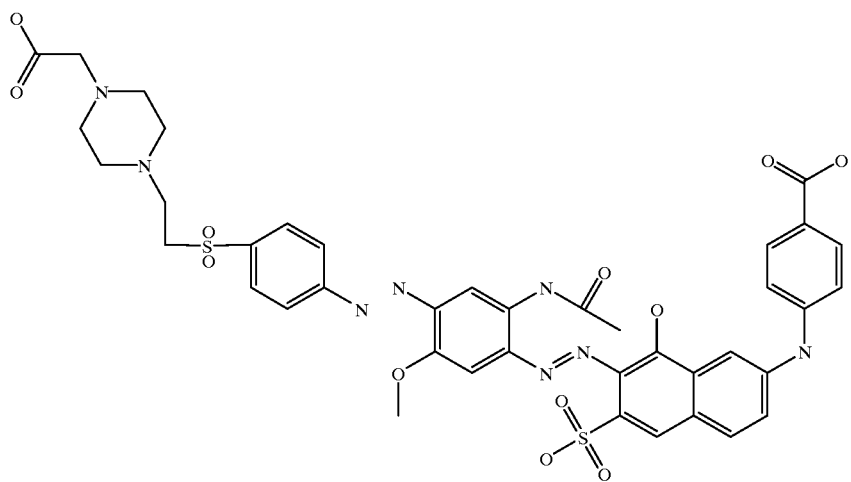
32
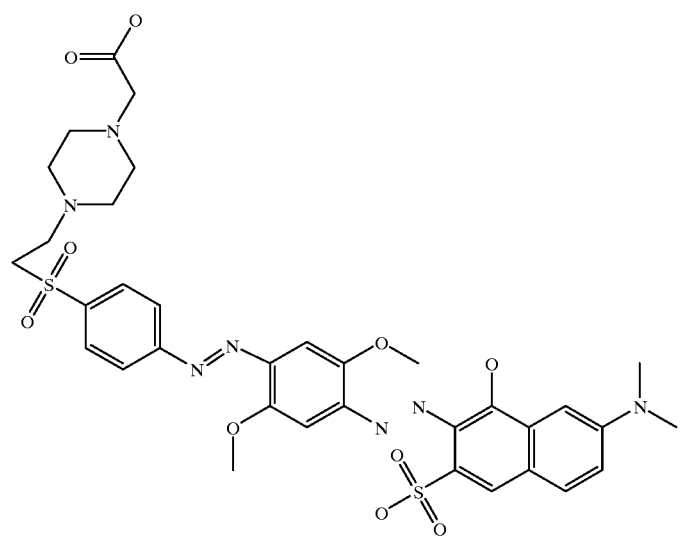
33

34
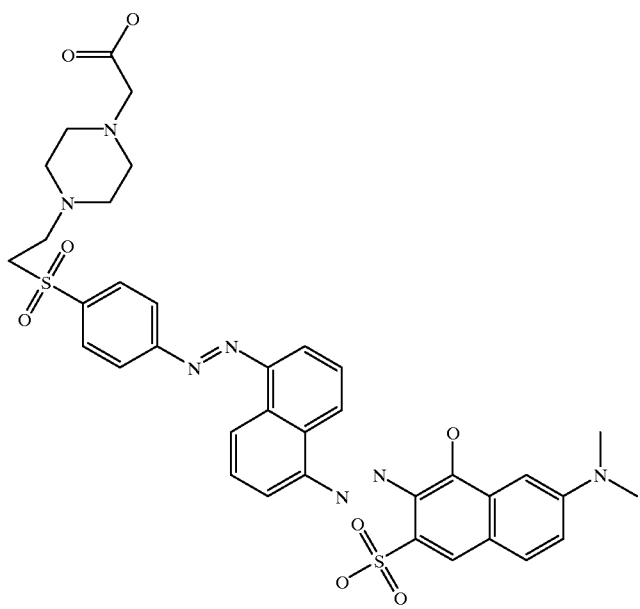
35
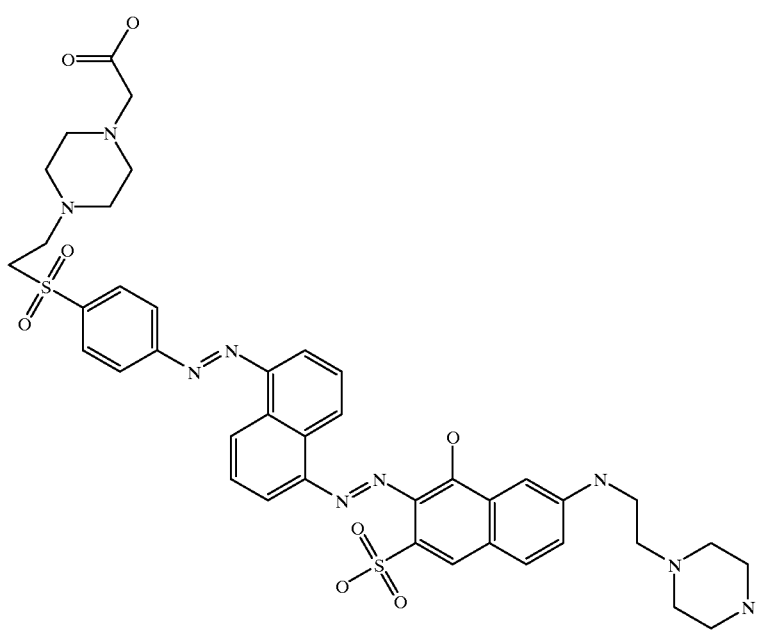

36
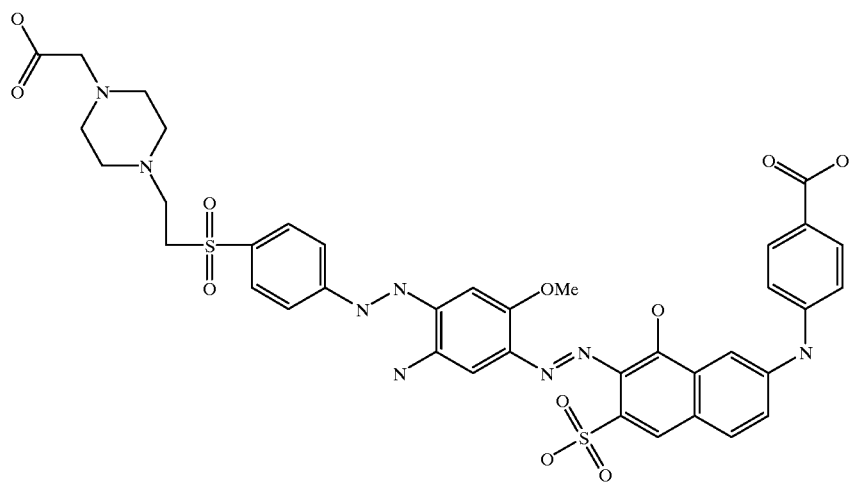
37
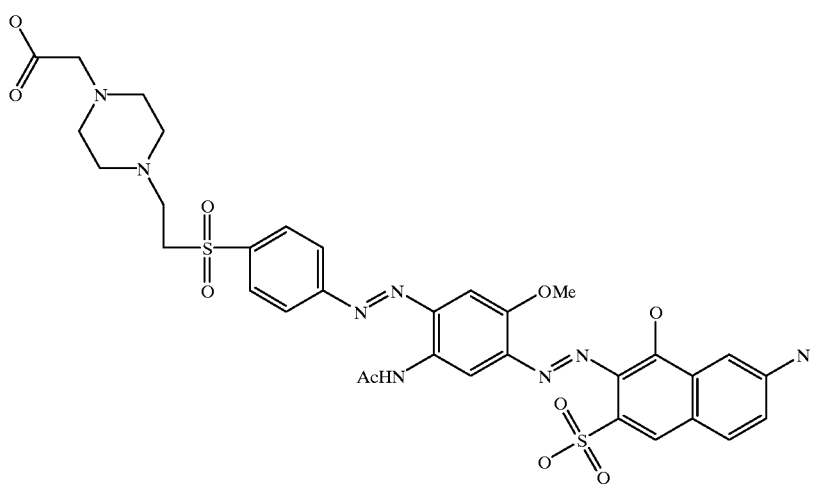
38
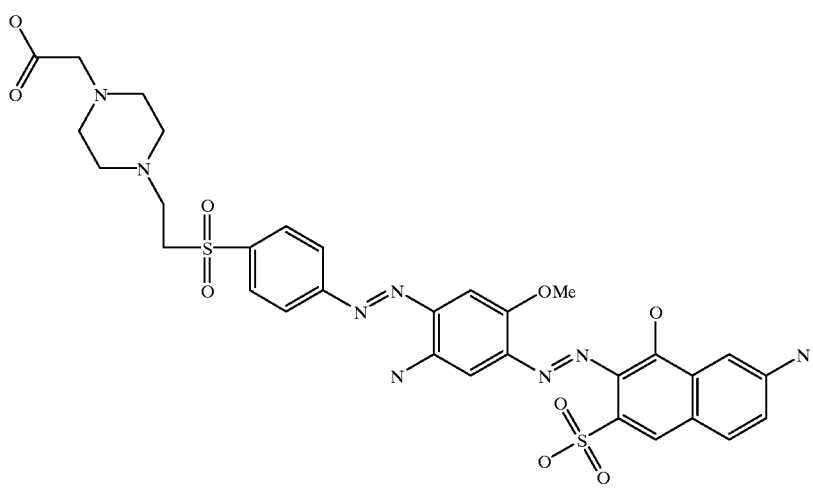

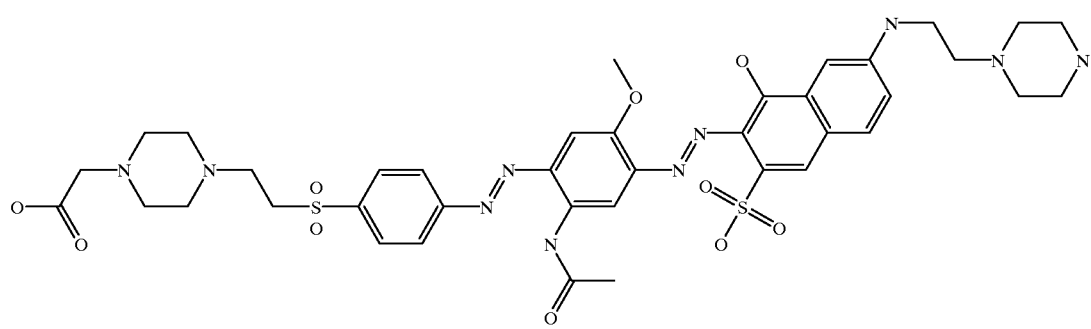
39
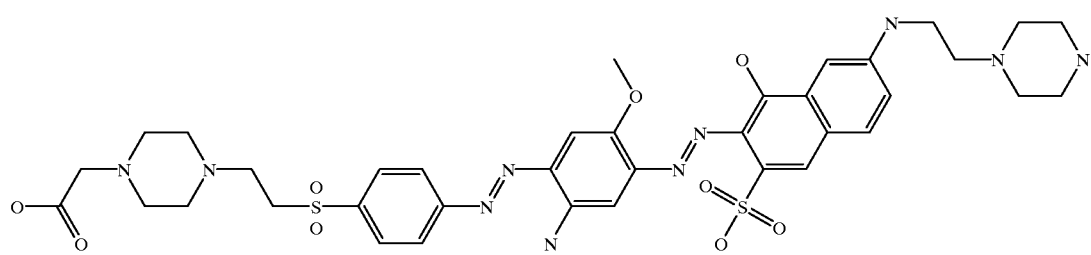
40
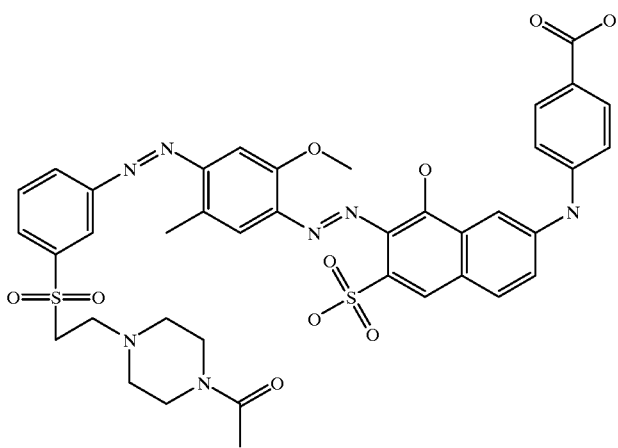
41
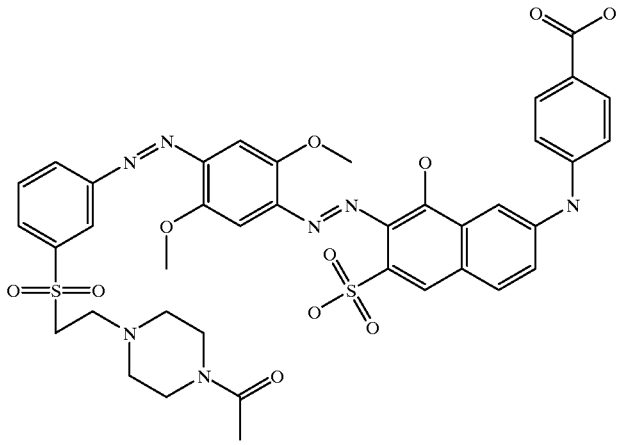
42

43
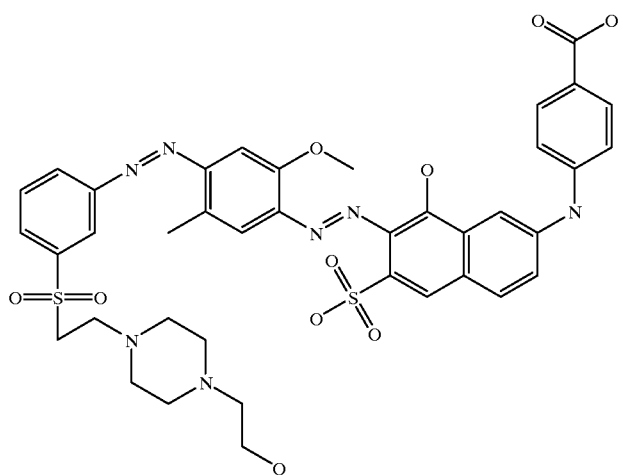
44
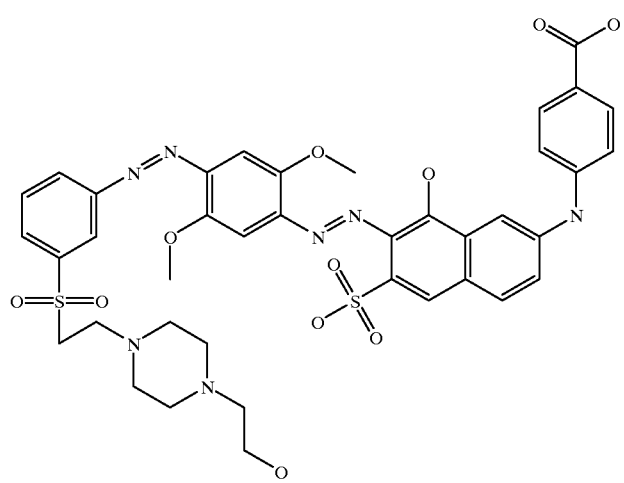
45
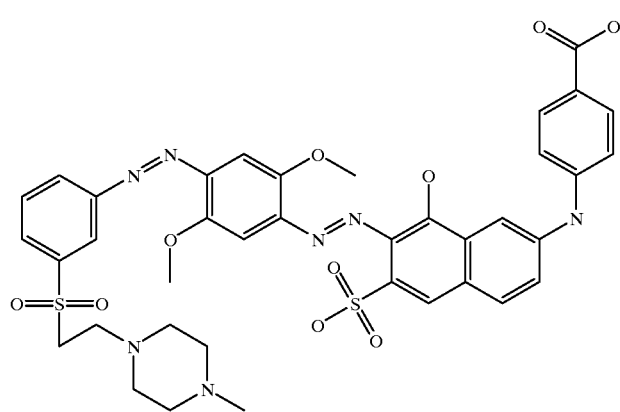

46
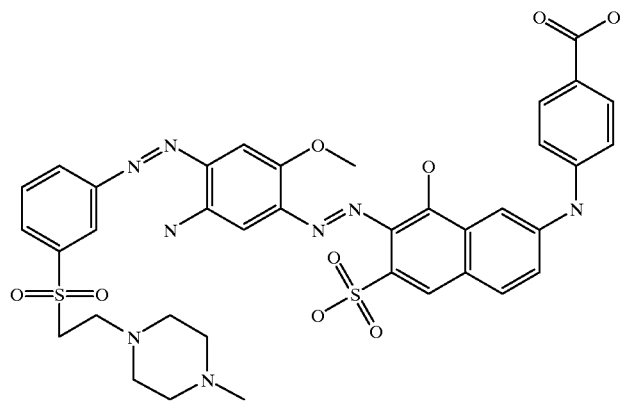
47
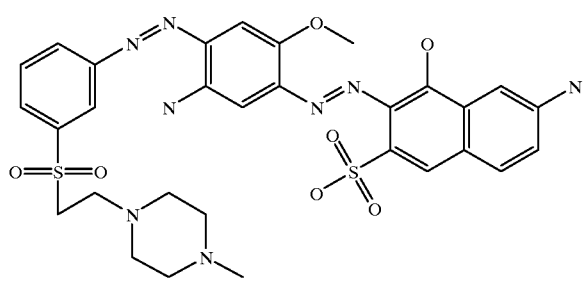
48
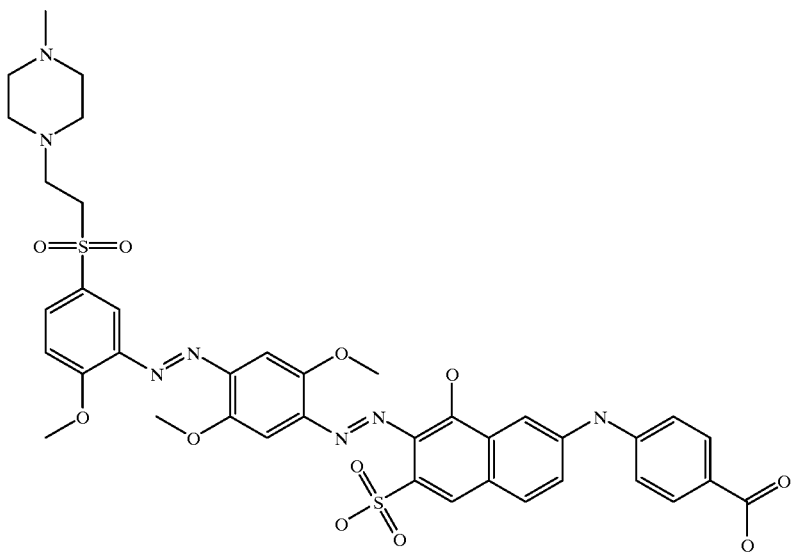

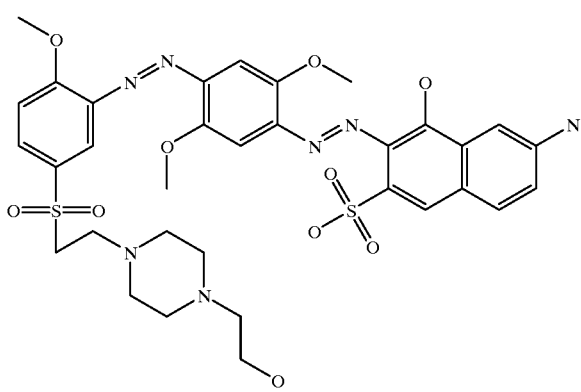
49
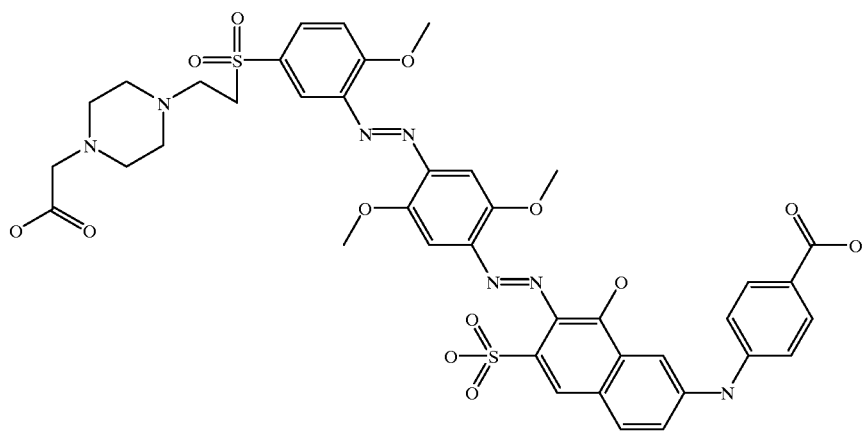
50
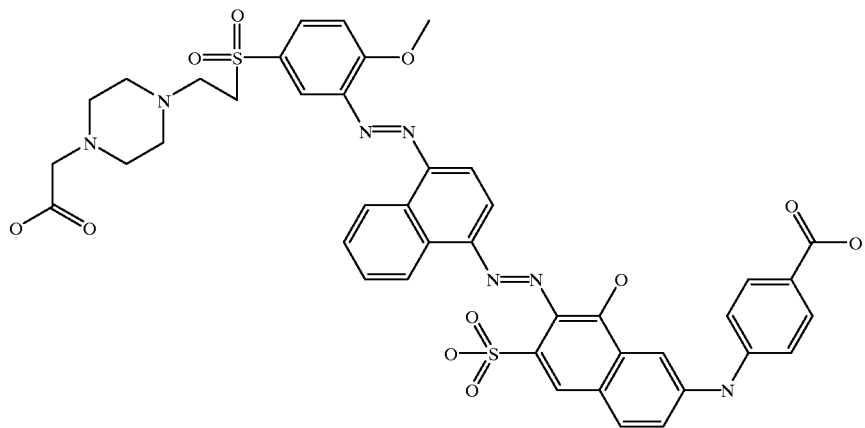
51

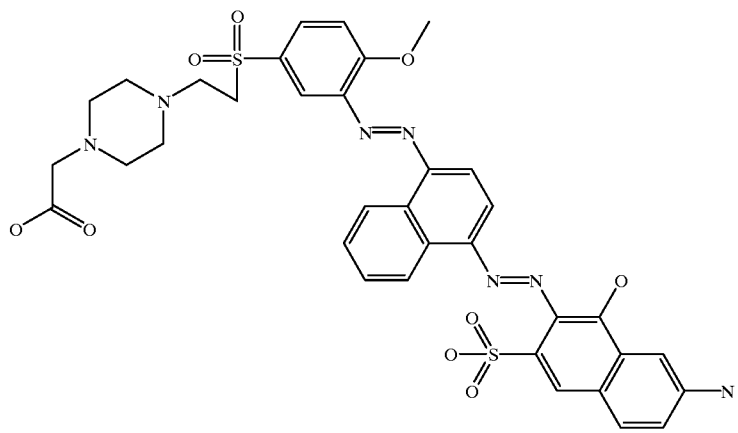

52

Ink Examples

Inks may be prepared according to the formulations described in Tables I and II wherein the Dye mentioned in the first column is the dye described in the above Example of the same number. Numbers quoted in the second column onwards refer to the number of parts of the relevant ingredient and all parts are by weight.

The inks may be applied to paper using a thermal or piezo ink jet printer to give black images.

The following abbreviations are used:

PG=propylene glycol
DEG=diethylene glycol
NMP=N-methyl pyrollidone
DMK=dimethylketone
IPA=isopropanol
MEOH-methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 5 | | 2 | 2 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | | 7 | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 8.0 | 90 | | 5 | 5 | | | 0.3 | | | | |
| 28 | 5.0 | 70 | | 10 | 4 | | | | 1 | | 4 | 11 |
| 29 | 2.2 | 75 | 4 | 10 | 3 | | | | 2 | | 6 | |
| 30 | 10.0 | 91 | | | 6 | | | | | | 3 | |
| 31 | 9.0 | 76 | | 9 | 7 | | 3.0 | | | 0.95 | 5 | |
| 32 | 5.0 | 78 | 5 | 11 | | | | | | | 6 | |
| 33 | 5.4 | 86 | | | 7 | | | | | | 7 | |
| 34 | 2.1 | 70 | 5 | 5 | 5 | 0.1 | 0.2 | 0.1 | 5 | 0.1 | 5 | |
| 35 | 2.0 | 90 | | 10 | | | | | | | | |
| 36 | 2 | 88 | | | | | | 10 | | | | |
| 37 | 5 | 78 | | | 5 | | | 12 | | | 5 | |
| 38 | 8 | 70 | 2 | | 8 | | | 15 | | | 5 | |
| 39 | 10 | 80 | | | | | | 8 | | | 12 | |
| 40 | 10 | 80 | | 10 | | | | | | | | |

We claim:

1. A compound of Formula (1) or a salt thereof:

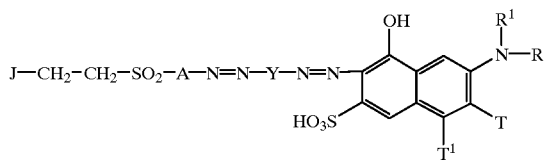

Formula (1)

wherein:

J is a group of the Formula (1a):

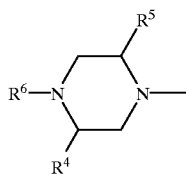

Formula (1a)

wherein:

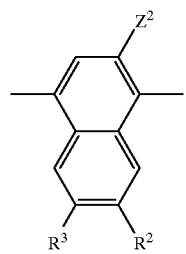

Formula (1b)

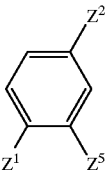

Formula (1c)

wherein

| | |
|---|---|
| $R^2$ & $R^3$ | each independently is H, —COOH or —$SO_3H$; |
| $Z^1$ & $Z^5$ | each independently is H, optionally substituted alkyl, optionally substituted alkoxy or —$NZ^3Z^4$; |
| $Z^2$ | is H, halo, —COOH, —$SO_3H$, —OH, optionally substituted alkyl, optionally substituted alkoxy or optionally substituted alkylthio; |
| $Z^3$ | is H or optionally substituted alkyl; |
| $Z^4$ | is H, optionally substituted alkyl or acyl; |
| $R^1$ | is H, optionally substituted alkyl, alkylcarbonyl, alkylsulphonyl, alkoxycarbonyl, alkoxysulphonyl, arylcarbonyl or arylsulphonyl; |
| T & $T^1$ | each independently is H or —$SO_3H$; |
| R | is H, optionally substituted alkyl, optionally substituted aryl, or a group —B—$NQ^1Q^2$; |
| B | is optionally substituted $C_{2-6}$-alkylene; and |
| $Q^1$ & $Q^2$ | each independently is H, optionally substituted $C_{1-4}$-alkyl or $Q^1$ and $Q^2$ together with the N atom to which they are attached form an optionally substituted 5- or 6-membered ring. |

2. A compound according to claim 1 wherein $R^6$ is —COOH, —$SO_3H$, alkyl, aryl, alkylcarbonyl, alkylsulphonyl, alkoxycarbonyl, alkoxysulphonyl, arylcarbonyl or arylsulphonyl each of which is optionally substituted and each of which carries at least one ionisable group.

3. A compound according to claim 1 wherein J is a group of the Formula (1a) and is free from ionisable groups and $R^6$ is H or optionally substituted alkyl, aryl, alkylcarbonyl, alkylsulphonyl, alkoxycarbonyl, alkoxysulphonyl, arylcarbonyl or arylsulphonyl.

4. A composition comprising two or more compounds of Formula (1), as defined in any one of claims 1 to 3.

5. An ink comprising a liquid medium and a compound of Formula (1), as defined in any one of claims 1 to 3.

6. An ink comprising a liquid medium and a composition according to claim 4.

7. An ink according to claim 5 or 6 wherein the liquid medium comprises a mixture of water and one or more water-soluble organic solvents.

8. A process for printing a substrate with an ink using an ink jet printer which comprises ink from the jet printer onto a substrate the ink is as defined in claim 5, 6 or 7.

9. A process according to claim 8 wherein the substrate is paper.

10. A substrate printed with at least one compound of Formula (1), as defined in claim 1.

* * * * *